US008749800B2

(12) United States Patent
Rimai et al.

(10) Patent No.: US 8,749,800 B2
(45) Date of Patent: *Jun. 10, 2014

(54) SYSTEM FOR GENERATING PERSONALIZED DOCUMENTS

(75) Inventors: Donald S. Rimai, Webster, NY (US); Chung-Hui Kuo, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 1198 days.

This patent is subject to a terminal disclaimer.

(21) Appl. No.: 12/649,380

(22) Filed: Dec. 30, 2009

(65) Prior Publication Data

US 2011/0157615 A1    Jun. 30, 2011

(51) Int. Cl.
*G06K 1/00* (2006.01)
*G06F 17/00* (2006.01)

(52) U.S. Cl.
USPC ........ 358/1.11; 358/1.16; 358/1.13; 715/236; 382/185; 382/202

(58) Field of Classification Search
None
See application file for complete search history.

(56) References Cited

U.S. PATENT DOCUMENTS

| | | | |
|---|---|---|---|
| 5,412,771 A | 5/1995 | Fenwick | |
| 5,777,605 A * | 7/1998 | Yoshinobu et al. | 345/173 |
| 8,416,454 B2 * | 4/2013 | Rimai et al. | 358/1.9 |
| 2001/0048436 A1 | 12/2001 | Sanger | |
| 2002/0140960 A1 * | 10/2002 | Ishikawa | 358/1.13 |
| 2005/0069203 A1 | 3/2005 | Khomo | |
| 2006/0179189 A1 | 8/2006 | Lin | |
| 2006/0218484 A1 * | 9/2006 | Saito et al. | 715/512 |
| 2007/0198441 A1 * | 8/2007 | Kara | 705/408 |
| 2009/0116744 A1 * | 5/2009 | Woo et al. | 382/187 |
| 2009/0138830 A1 * | 5/2009 | Borgaonkar et al. | 715/863 |
| 2010/0002936 A1 * | 1/2010 | Khomo | 382/187 |

FOREIGN PATENT DOCUMENTS

| | | |
|---|---|---|
| EP | 1 089 192 A2 | 4/2001 |
| EP | 2 073 527 A1 | 6/2009 |
| WO | WO 97/41513 A1 | 11/1997 |

OTHER PUBLICATIONS

Michael Kokula: "Automatic Generation of Script Font Ligatures Based on Curve Smoothness Optimization", Electronic Publishing, vol. 7, No. 4, Dec. 1994, pp. 217-229, XP002621118, John Wiley & Sons, the whole document.

Hodgson et al: "Connecting Characters to Simulate Handwriting", IP.com, Journal, IP.com.inc., West Henrietta, NY, US, Mar. 1, 1993, XP013092670, ISSN: 1533-0001, the whole document.

Lin et al: "Style-preserving English Handwriting Synthesis", Pattern Recognition, Elsevier, GB, vol. 40, No. 7, Mar. 30, 2007, pp. 2097-2109, XP022009144, ISSN: 0031-3203, DOI: DOI:10.1016/J.PATCOG.2006.11.024, Figures 1, 2, Sections 4., 4.1, 5.2.1.

\* cited by examiner

*Primary Examiner* — Thomas D Lee
*Assistant Examiner* — Pawandeep Dhingra
(74) *Attorney, Agent, or Firm* — Eugene I. Shkunko; Amit Singhal (57) ABSTRACT

A system with for capturing and storing an image of a user's handwritten alphanumeric characters. The characters are stored in memory in association with a standard alphanumeric character set such as an ASCII character set. A text document can then be transcribed into the stored handwritten alphanumeric characters for resembling a handwriting of the user. The characters can be represented by mathematical functions such as Taylor Series or McLauren Series and can be digitally reproduced based on the stored functions.

11 Claims, 6 Drawing Sheets

SYSTEM FOR GENERATING PERSONALIZED DOCUMENTS

CROSS REFERENCE TO RELATED APPLICATIONS

Reference is made to commonly assigned, U.S. patent application Ser. No. 12/649,374 (now U.S. Pat. No. 8,416, 454) by Kuo et al. filed of even date herewith entitled "Method for Generating Personalized Documents," the disclosure of which is incorporated herein by reference in its entirety.

FIELD OF THE INVENTION

This invention relates to a method and apparatus for printing customized documents. Specifically, this invention uses digital printing and scanning technology to produce a document of which at least a part is in the handwriting of the individual producing the document.

BACKGROUND OF THE INVENTION

There are many personalized documents generated. For example, Christmas letters often contain family photos. Disney World takes digital pictures of customers on rides and offers to sell them to the customer. Other applications abound. However, there is presently no easy way to generate customized documents today. This is especially problematical if one wants to send a letter or postcard with a photo one took with a caption. For example, custom picture postcards come to mind where one may want to combine a photo one took himself or a purchased picture with a written note and send it to an individual. The problem is compounded when one wants to send similar notes, individually addressed but almost identical, to a number of people. An example might include sending a set of picture postcards to friends and family. A preferred embodiment of the present invention describes a method of producing such cards or documents.

SUMMARY OF THE INVENTION

Digital prints can be stored on a computer. For example, a tourist location may store a number of photos and charge a customer for their purchase. Alternatively, an individual can download his own pictures from a digital camera into the computer. More than one photo can, of course, be used in a document. Alternatively, different photos can be used for different documents if desired. The individual then maps his handwriting into the computer. This can be done using a digitizing tablet similar to that used for many credit card signatures at stores. The customer stores each alphanumeric and maps that to a known letter, thereby defining a set of fonts corresponding to his handwriting. This allows him not only to write a letter in his own handwriting, but to sign the letter. Alternatively, selected portions of the letter or document may be in his own handwriting. The written document is then combined with the photo(s) in the desired manner. For example, picture postcard templates can be generated or stored in the computer and the written and pictorial images pasted onto the template, as desired, to form the document. Creative photos can also be created for this application using known software technology such as Photoshop. Thus, a photo of a person riding a whale, for example, can be produced for use on the card.

The document can be created by typing directly into the computer using the individually generated font. Alternatively, word recognition software can be used to translate spoken words into text, again in the individual's handwriting. Documents can be customized using software such as "Mail Merge". If greater changes are needed, the file can be stored and edited as desired.

As one application, a visitor to a place such as Disney World can combine local photos in one of the theme parks with the personalized verbiage and an address of a recipient, and have the postage imprinted on the card digitally. In addition, the machine software can adjust the postage for the size and weight of the card being printed based on which media tray sources the card. For example, various types of card stock can be inputted into the software and different trays can contain such card stock of varying sizes. By knowing the type of card stock, thereby knowing the weight of the card stock, and the size of the card, the computer can automatically compute the weight of the card and determine the proper postage. Alternatively, the size of the card can be manually inputted into the computer. In another mode of practicing this invention, adjustable guides in a tray holding the card stock can be attached to a sensor that automatically inputs the size of the card into the computer, thereby allowing the weight of the card to be calculated and the proper postage determined. It can then be printed on a coupled printer, including a personal message, postage, and address, or it can be electronically sent to the hotel where the tourist is staying, and printed and mailed from the hotel without the tourist ever having to touch the card.

A preferred embodiment of the present invention includes a printing system with an attached image capture device for capturing and storing on a computer system an image of a user's handwritten alphanumeric characters. The characters are stored in memory in association with a standard alphanumeric character set; such as an ASCII character set. A text document can then be transcribed into the stored handwritten alphanumeric characters that resemble a handwriting of the user. The printed document thus resembles a document as if handwritten by the user. The characters are represented by mathematical functions such as Taylor Series or McLauren Series and can be digitally reproduced based on the functions. An embodiment of the invention includes printing a personalized card, such as a post card, that includes postage, address, a digital image, and with the digital text characters that resemble a handwriting of the sender. The sender's signature can also be accurately digitally printed on the card in a location selected by the sender. The characters can be spline fitted together so that the handwriting resembles the handwriting of the sender in a cursive style.

Another preferred embodiment of the present invention includes a system comprising a computer, an electronic memory, and a printer for printing a document comprising a user selected digital image together with a personal message in a user's own handwriting digitally printed on the document. A document editor can be used to generate the document. A keyboard is used to enter a personal message and the message is printed in the user's handwriting. A GUI also displays the personal message in the user's own handwriting so that the user can select a location on the receiver sheet for printing his message and signature. The handwritten alphanumeric characters of the user are stored in an electronic memory of the computer and are displayed via the GUI while the user types on the keyboard in the usual manner. In this way, the system outputs a response as though the user's handwritten characters are a computer provided and user selectable font. The handwritten characters are mapped to a standard ASCII character set in the computer system and so are made available a to the user in the manner of other selectable fonts.

Another preferred embodiment of the present invention is a card having printed thereon an address, correct postage, and digital text characters printed in a personalized font resembling a handwriting of the sender. The sender's signature, as well as the message, are digitally printed on the card in a location selected by the sender. The sender is able to generate his message by typing on a keyboard in the usual manner.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor limited to any combinational relationship with respect to interchangeability, substitution, or representation of an actual implementation.

DETAILED DESCRIPTION OF THE INVENTION

Printing documents using digital means such as electrophotographic or ink jet technology requires that an appropriate image or images first be inputted into the digital print engine. This is generally accomplished by first inputting the components making up the document into a device such as a computer via use of a word processor or other user application for entering character data or image data on a document and storing the document in the computer system. This can be done using a keyboard or other device such as a scanner, translating the inputted information into a language such as Postscript that directs a printer to print the document, and then printing the document. Consider, for example, producing a document using an electrophotographic print engine. A print is typically first prepared by typing the document into a device such as a computer. The input can include alphanumeric characters characterized by the well known ASCII code that is assigned to various characters such as English characters. Drawings or other figures consisting principally of lines and shapes can also be created using known techniques. More complex images such as photographs can be printed by inputting the image into the computer. In some instances, such as when the image is in electronic format as would be the case when the image is captured using a digital camera, the image can be directly inputted into the computer and stored, for example, as a bitmap, TIFF, PEG, or similar file. Alternatively, if the image exists as a hard copy, it can be scanned into the computer. Specific items included in the desired document, such as a signature of an individual, can also be inputted either by scanning a document with that signature and storing it as a bitmap or inputting it from a digitizing tablet, as is commonly done when printing charge card receipts at a cashier in a store.

In a typical digital print engine such as one using electrophotographic technology, a print is made by first uniformly charging a primary imaging member such as a photoreceptive member, often referred to as a photoconductor in the literature. This is usually accomplished using a grid controlled corona charger or roller charger. An electrostatic latent image is then formed on the primary imaging member. In the case of an electrophotographic print engine, this is done by imagewise exposing the primary imaging member to light, typically using a laser scanner, an LED array, or an optical exposure system.

The electrostatic latent image is next transformed into a visible image by bringing the primary imaging member into close proximity to a development station containing a developer. Typically, the developer contains marking particles, also referred to as toner or toner particles. The developer can also contain magnetic carrier particles that transport the toner particles and against which the toner particles tribocharge. Alternatively, some development stations do not contain carrier particles. These are commonly referred to as single component development stations and the developer contained therein is referred to as a single component or monocomponent developer.

After development, the visible image is transferred to a receiver such as paper. The image is then fixed to the receiver, typically by subjecting the image-bearing receiver to a combination of heat and pressure. The primary imaging member is cleaned and made ready for subsequent printing.

The information to be printed can be inputted into the printer from several sources. A document can be prepared and stored using a computer. Alpha-numeric characters are generally translated into a code such as an ASCII code corresponding to a standard set of English characters. The ASCII code is translated into a driver that addresses the writer using a postscript language. This allows the formation of an electrostatic latent image.

Alternatively, information to be printed can be fed into a computer using a scanner, digitizing tablet, or signature machine such as is commonly used to generate signatures in stores using charge card readers attached to a cash register. The inputted information can be stored in the computer in PEG, TIFF, or BITMAP format. However, the information stored in those manners has little ability to be manipulated. This creates a problem if one wishes to input alphanumeric characters and allow them to be manipulated in a manner that would simulate a handwritten note.

However, whereas those inputs are typically directly inputted to the printing device, thereby precluding any sort of manipulation such as combining the characters in a manner to allow the creation of different sentences or allowing the positioning of the characters to allow their placement in a controlled manner chosen by the individual to create a document, it is the purpose of a preferred embodiment of the present invention to describe a method whereby those alphanumeric characters can be inputted in such a manner as to allow them to be manipulated and enable documents to be created.

In a preferred embodiment of the present invention, hand written alphanumeric characters are input into a computer using known means such as scanning and storing individual letter images using a scanner or, alternatively, inputting the characters using a digitizing tablet, or using a signature machine such as is commonly used at cash registers for customers to sign their credit card receipts. In respect of this, and with reference to FIG. 1A, a first step of a preferred embodiment of the present invention includes digitally recording a user's hand written alphabet (uppercase and lowercase), as exemplified at 101 with five letters illustrated, on a digital recording device. Preferably, the recording device includes the capability of recording the horizontal/vertical location and/or time of each written alphabet character, illustrated at 103. If the recording device is unable to capture time information, such as a flatbed scanner, the created personalized fonts can be saved in image mode. The character images provide x,y coordinates and the time axis data can then be extracted from the stored character images. The time domain axis is an arbitrary variable which, if obtained from a device capable of recording time data for hand written characters, is partially explained by the speed of the writer's hand. This data is not essential for accurately recording the shape of the hand written characters, thus, the x,y coordinates can be easily mapped to an arbitrarily generated time window. The result of the collected x,y data plotted on a time axis is shown at 103, with graph 110 displaying the x coordinates of the letter "C" and the graph 111 displaying the y coordinates thereof. Using these x,y coordinate data the character "C" can be generated as shown at 109, with the x axis values 107 and y axis values 106 of the character "C" 109 corresponding to the x coordinate data 110 and the y coordinate data 111. The following description of the present invention is directed to the example letter "C" illustrated herein, and is respectively applicable in its entirety to the four other letters "h", "u", "n", and "g" illustrated in the Figures.

Figure 1A:
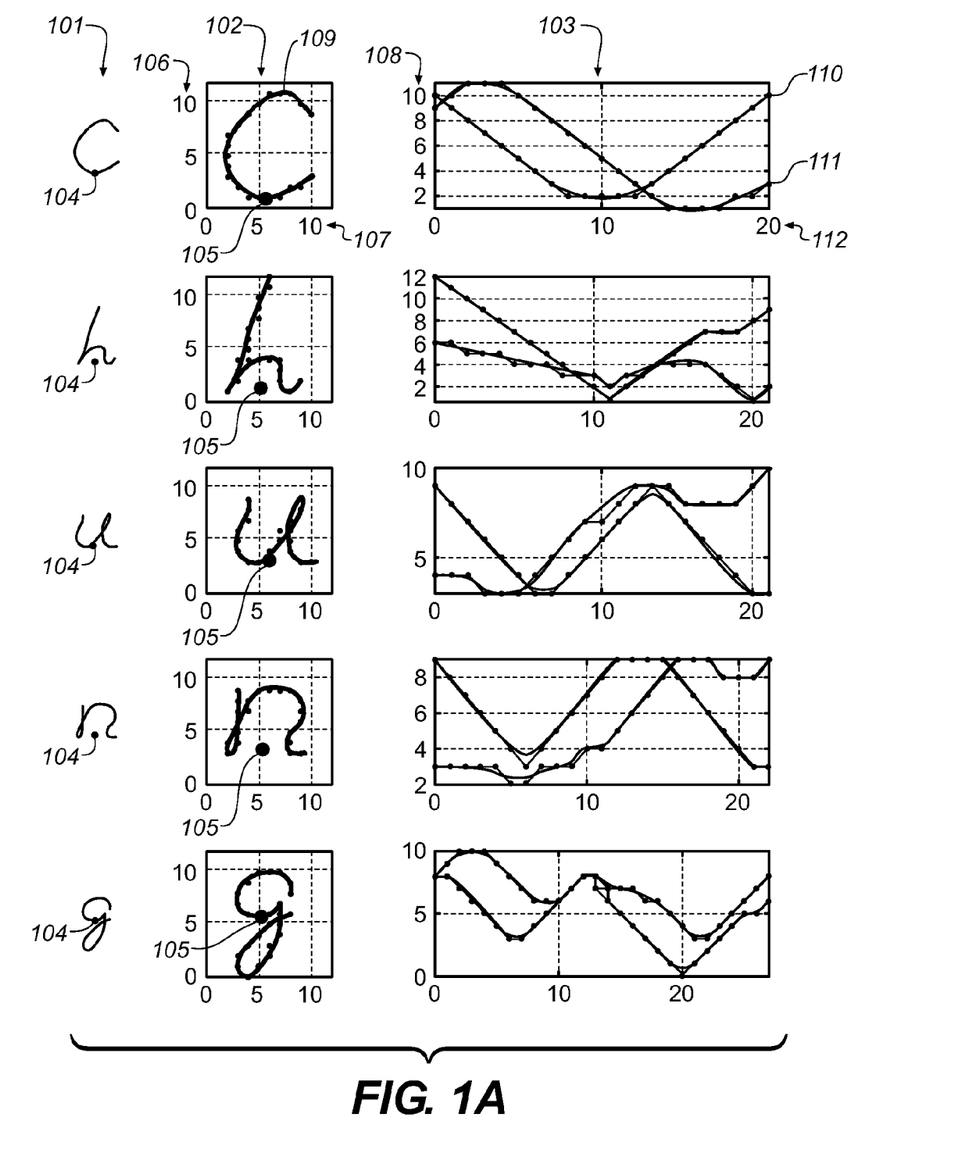
FIGS. 1A-B illustrates functional representation of hand written English letters.
Figure 1B:
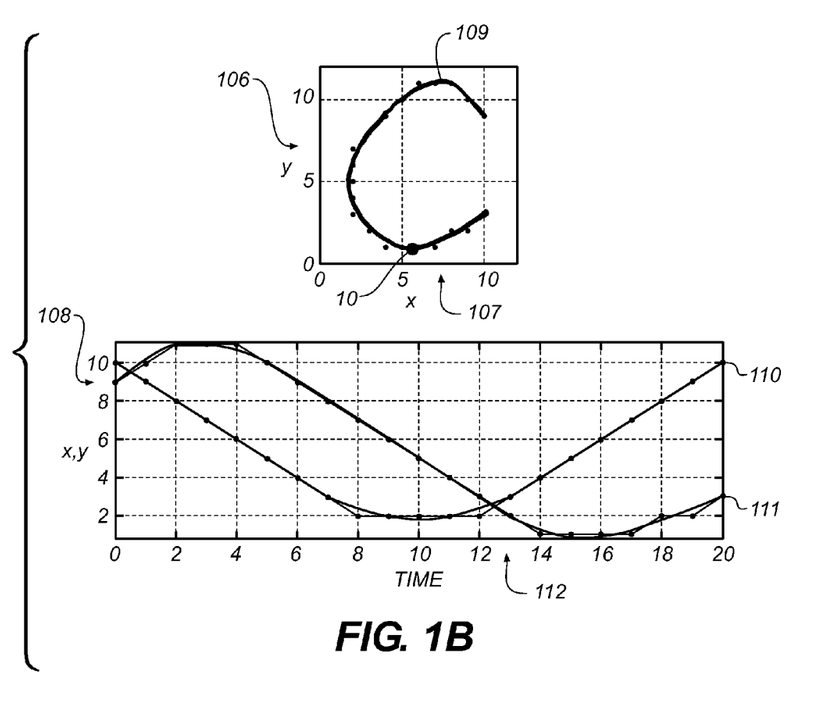

FIG. 1B shows a close-up of the mathematical representation of the letter "C" described above, with like numerals representing like elements with respect to FIG. 1A. It can be seen in the graph of FIG. 1B that there are twenty one pairs of x,y data points depicting the letter "C", each pair corresponding to a point on the data generated "C" shown above the graph. The number of data points can be arbitrarily selected or automatically generated by software.

The handwritten characters, after being inputted into the computer, can be stored in various formats such as JPEG, TIFF, or BITMAP files. The characters are then converted into mathematical algorithms as represented by the graphs 103, often referred to as vectorizing. This is accomplished by fitting the characters using infinite series. In one mode of operation, the characters are fit to a Taylor expansion series or a Maclaurin expansion series. Not all characters can be fit to a single mathematical function (or "functional"). For example, the letter script letter "u" has local maxima that cannot be fit to a single continuous function using an infinite polynomial series. Similarly, the letter "o" cannot be described using a single value function. In such cases, the handwritten alphanumeric characters can be fit using piecewise continuous functions each representing a portion of the letter shape. Alternatively, the x- and y-positions of all points used to describe a character can be fit using a pair of parametric equations. For example, the x- and y-displacements for each character can be described as a function of time, which would depict, using an arbitrary scale as explained above, the time needed to physically draw a character.

The mathematical functions depicted at 103 are translated into ASCII characters such as those corresponding to English characters using software that has been installed in the computer. In one mode of operation, the software can prompt the user to identify to which alphanumeric character a specific handwritten character corresponds, or the correspondence can be entered manually or installed as a predefined file. In essence, the computer should have the software that would allow the user to map the inputted alphanumeric characters into recognized fonts. Each written character is encoded by the associated functional representation.

When the computer is used in a mode where handwritten text is desired, the ASCII code translates the letter into continuous or piecewise continuous functions as previously described. Those functions then drive a writer such as an LED array or laser scanner to create the electrostatic latent image, which is then developed into a visible image, as previously discussed.

Figure 2:
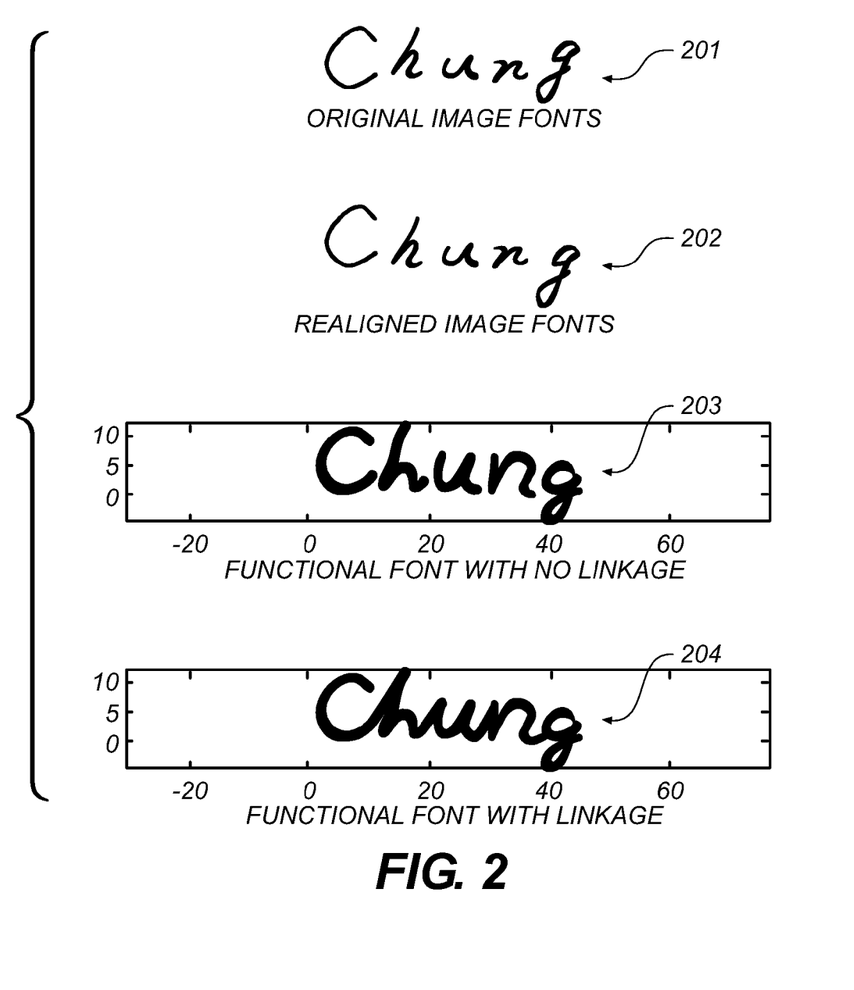
FIG. 2 illustrates the letters, printed separately, to form the name of one of the inventors in the image-mode and functional-mode.

In forming the handwritten alphanumeric fonts, for alignment purposes it is important to locate and align the position of each alphanumeric character by establishing an anchor point for each character. These anchor points, which are arbitrary, allow the characters to be aligned as exemplified in FIG. 2 by comparing alignments 201 and 202, allow multiple lines of text to be printed, and also establish the spacing between two characters. The anchor point can be readily established by mapping the area to be printed into a grid, such as defined by axes 106, 107, and assigning a point on each character 104, 105 to a point on that grid. For example, the anchor points for letters that have local minima such as the letters "c", "o", or "u" can be chosen at the minimum, i.e. the point where the first derivative of the polynomial function used to fit the character is zero and the second derivative is positive. Letters that have local maxima such as "n" or "h" can be anchored at one of those maxima. Alternatively, the anchor can be established at the midpoint of the line segment connecting the local minima, for example, at the point that is the center of the x character data and the bottom of the y character data 105. Optionally, as exemplified by the anchor point for the letter "g" of FIG. 1A, the anchor can be established at the point that is the center of the x character data and the center of the y character data. The latter method has the advantage of making the character symmetric about the anchor point, thereby facilitating fixing the character on the grid.

An anchor point will be assigned to each input alphabet with either a predefined relative position or adaptive position to align the characters. The horizontal-position/time and vertical-position/time relationship is modeled separately by a set of mathematical functionals such as 1-dimensional Spline and piecewise Taylor series. The anchor points could also be used so that the anchor points can be arbitrarily located on the page such as when a text message contains multiple lines.

Figure 4:
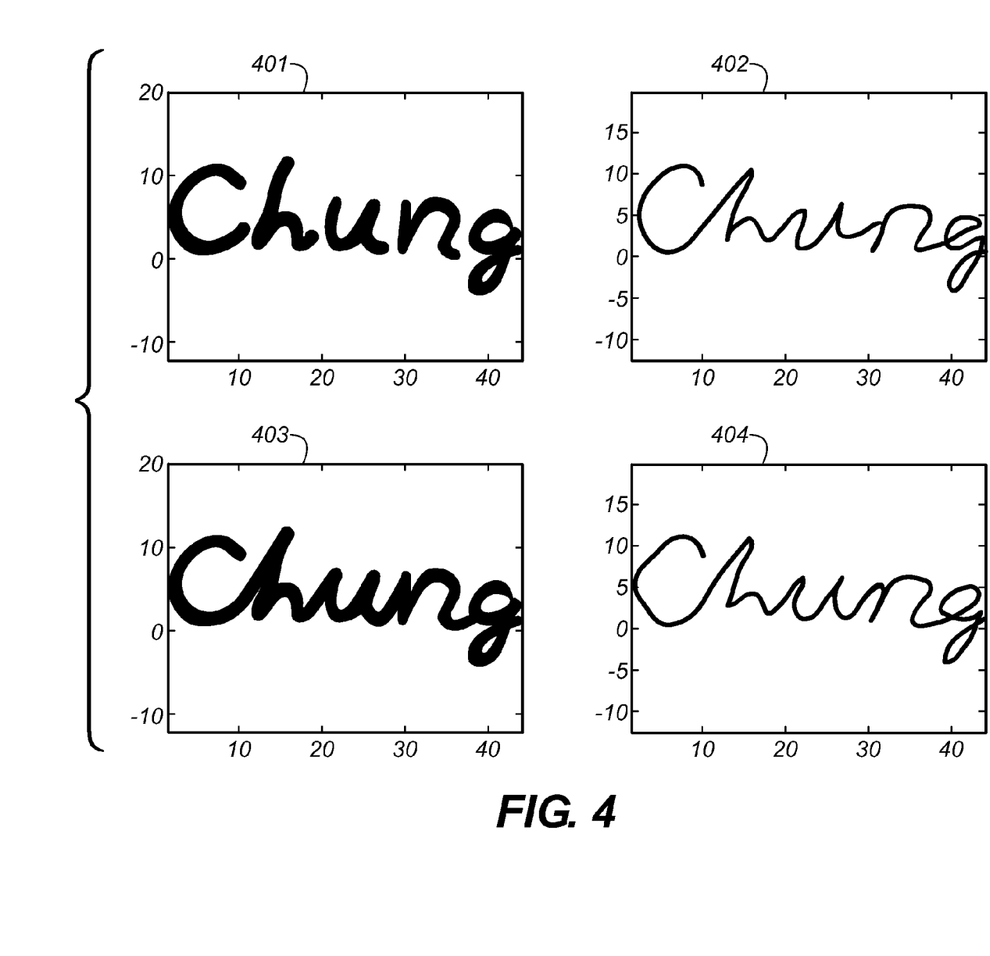
FIG. 4 illustrates the letters joined, resulting in the name being written as it would appear in cursive writing under no-linkage and auto-linkage scenarios.

The letters can be connected using spline fitting techniques as illustrated by comparison of non-linked characters 203 (FIG. 2) and 401 (FIG. 4) with linked characters 204 (FIG. 2) and 403 (FIG. 4). For example, the letters, which are fixed at an established distance from each other using the grid, can be connected using a predefined functional stored in the computer. This allows the option of either connecting letters, as would generally be desired for cursive writing, or not connecting the letters, as would be desired for manuscript or numeric input.

Figure 3:
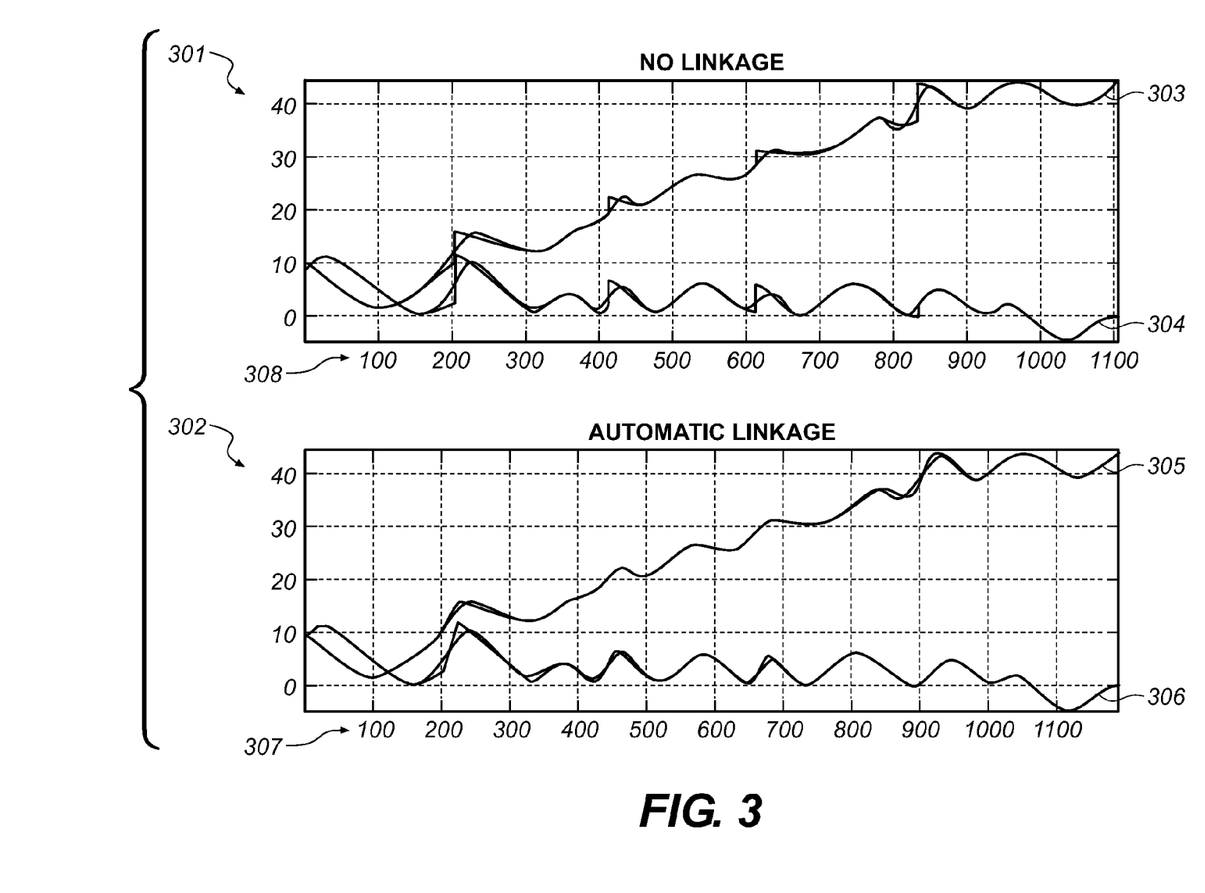
FIG. 3 illustrates post font-processing by filtering the corresponding waveforms.

A first step of a preferred embodiment for this fitting procedure includes digitally recording a user's input of hand written letters into the character generator, which can include a scanner or digitizer. In pure image mode, all input letters will be first fetched from the corresponding computer memory, re-sampled based on a required font size, and composed into the needed format. Each anchor point will be aligned along a linear direction, typically substantially horizontal. In the functional mode, users can select whether to link between consecutive letters or not. In the no-linkage case, each input letter is recreated based on the associated functional form and the intended font size. Each letter is moved to the designated location based on the desired layout format. This is illustrated in FIG. 3 at where 303 represents the x coordinates and 304 represents the y coordinates for the five letter unlinked name "Chung" 301. With reference to x axis coordinates 308 the letter "C" is illustrated by data points from 0 to about 200, the letter "h" from about 200 to 400, the letter "u" from about 400 to 600, the letter "n" from about 600 to 800, and the letter "g" from about 800 to 1000. At each letter juncture, i.e. 200, 400, 600, 800, a vertical jump in the graph indicates that the characters are non-linked characters and are "disjointed" a illustrated at 203 and 401.

In the automatic linkage case, a predefined distance is first inserted between two letters which belong to the same word. The horizontal/vertical position of the first letter is connected to the horizontal/vertical position of the second letter via a predefined functional, such as a one-dimensional polynomial. A set of boundary conditions can be imposed to optimize the linkage form, such as the continuity of the first derivative. Each completed word is then moved to the designated location based on the desired layout format. This is illustrated by the mathematical representation depicted at 302, showing that at each letter juncture, 200, 400, 600, and 800, the letter functionals are "gradually" linked by replacing the vertical jumps, shown in 301, with the predefined functionals having continuous first derivatives. Each composed word can optionally be further processed by manipulating the corresponding waveform, as illustrated at 402, 404.

A preferred embodiment of this invention is very suitable for use when producing customized documents such as picture postcards. For example, on one side of the card, a photograph can be printed either from a photograph inputted by the user into the computer or from pictures stored in the computer. The photograph can be made glossy using known glossing techniques in the electrophotographic community. On the other side of the card, names and addresses can be printed using conventional fonts to facilitate readability. In another area, small font can be used to describe the photograph. Finally, a message can be printed using the handwritten font. A preferred embodiment of the present invention is very suitable for mailing multiple cards to different individuals or addresses using known software features such as mail merge. Finally, postage can be metered onto the card, either downloaded from a source such as the post office or from postage metering software in the computer. For some applications, the card can be composed in one location and printed and mailed in another. For example, a user overseas can compose a picture postcard, but have it printed at another site in proximity to the address to which it is being sent. This can reduce delivery time and postal costs.

A preferred embodiment of the present invention is particularly suited for allowing documents to be printed in a predetermined form or template. For example, a picture postcard typically has a photograph or picture on one side. On the opposite side, the right half is reserved for address information. Postage is at the upper right corner. On the left, near the top, in small fonts, is a description of the picture. Below is the handwritten message. Preformed templates can be stored in the computer that facilitate the formation and printing of such documents.

Figure 5:
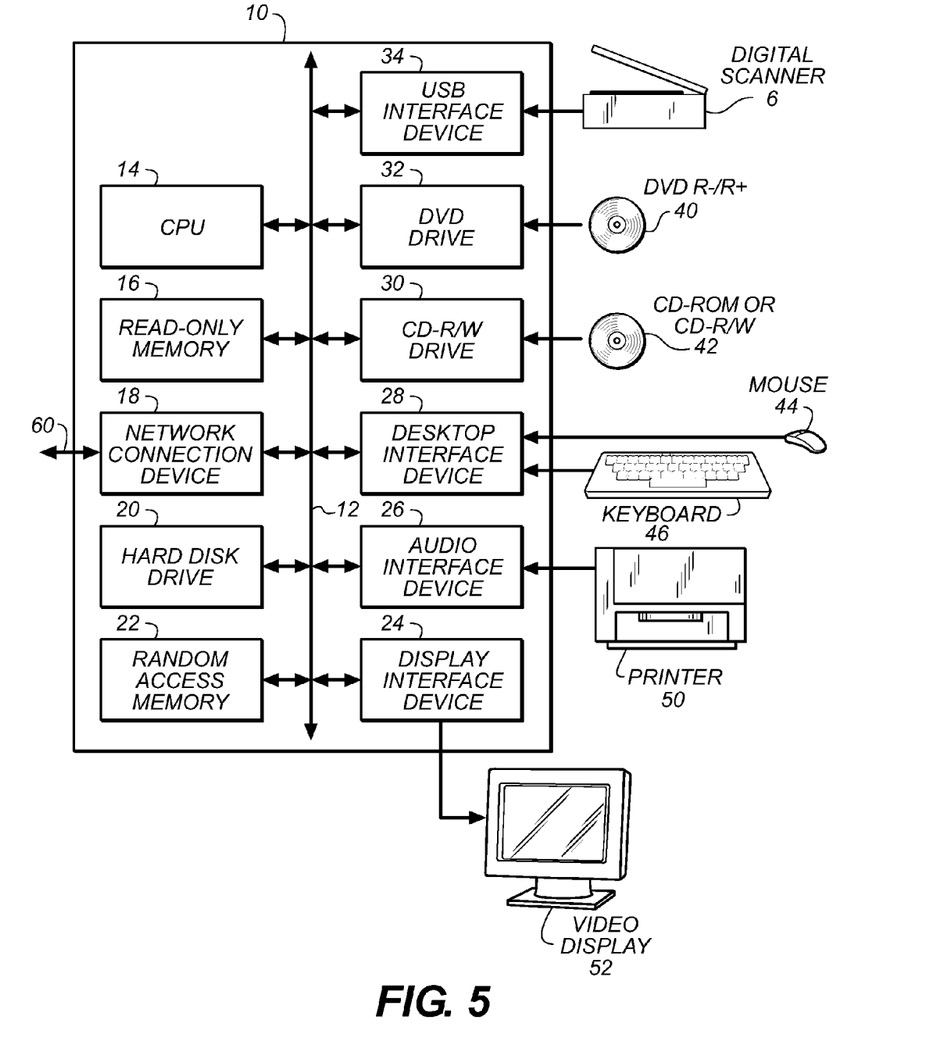
FIG. 5 is a block diagram of a computer system sufficient for practicing various embodiments of the present invention.

FIG. 5 illustrates an example computer system for practicing embodiments of the present invention. In this example embodiment, the system includes a computer 10 which typically comprises a keyboard 46 and mouse 44 as input devices communicatively connected to the computer's desktop interface device 28. The term "computer" is intended to include any data processing device, such as a server, desktop computer, a laptop computer, a mainframe computer, a router, a personal digital assistant, a Blackberry, and/or any other device for computing, and/or classifying, and/or processing, and/or transmitting, and/or receiving, and or retrieving, and/or switching, and/or storing, and/or displaying, and/or measuring, and/or detecting, and/or recording, and/or reproducing, and/or utilizing any form of information, intelligence or data for any purpose whether implemented with electrical and/or magnetic and/or optical and/or biological components, and otherwise. The phrase "communicatively connected" is intended to include any type of connection or transmission media, whether wired, wireless, or both, between devices, and/or computers, and/or programs in which data may be communicated. Further, the phrase "communicatively connected" is intended to include a connection between devices and/or programs within a single computer, a connection between devices and/or programs remotely located in different computers, and a connection between or within devices not located in computers at all.

Output from the computer 10 is typically presented on a video display 52, which may be communicatively connected to the computer 10 via the display interface device 24. Internally, the computer 10 contains components such as CPU 14 and computer-accessible memories, such as read-only memory 16, random access memory 22, and a hard disk drive 20, which may retain some or all of the digital objects, print documents, character data, and programming referred to herein. The phrase "computer-accessible memory" is intended to include any computer-accessible data storage device, whether volatile or nonvolatile, electronic, magnetic, optical, or otherwise, including but not limited to, floppy disks, hard disks, Compact Discs, DVDs, flash memories, such as USB compliant flash drives, for example, ROMs, and RAMS.

The CPU 14 communicates with other devices over a data bus 12. The CPU 14 executes software stored on, for example, hard disk drive 20. In addition to fixed media such as a hard disk drive 20, the computer 10 may also contain computer-accessible memory drives for reading and writing data, such as print data, from and to removable computer-accessible memories. This may include a CD-RW drive 30 for reading and writing various CD media 42 as well as a DVD drive 32 for reading and writing to various DVD media 40. A printer 50, such as an inkjet or electrophotographic printer is also communicatively connected to a printer interface device 26 for communicating with processor 14 over data bus 12. The printer 50 preferably includes multiple media trays for providing a plurality of automatically selectable receiving media sheets. Printer 50 typically includes memory for storing print information, such as Postscript data, for formatting documents to be printed. Additional information can be stored for each type and size of media, including a finish and/or color of media, stored in the media trays and an amount of required postage to be printed on a media sheet if mailing the media sheet is desired. The printer preferably includes selectable printing options such as double sided printing, selectable character fonts, selectable character files, etc. These selectable options can be controlled by user input to the computer system via the mouse 44 or keyboard 46 illustrated, and as confirmed by a convenient graphical user interface on video display 52. A digital scanner 6 or other image capture device such as a digitizing tablet or a camera can be communicatively connected to the computer 10 through, for example, the USB interface device 34 to transfer scanned digital images from the scanner 6 to the computer's hard disk drive or other connected memory devices. Finally, the computer 10 can be communicatively connected to an external network 60 via a network connection device 18, thus allowing the computer to access digital objects and media assets from other computers, devices, or data-storage systems communicatively connected to the network. A "data-storage system" may include one or more computer-accessible memories, and may be a distributed data-storage system including multiple computer-accessible memories communicatively connected via a plurality of computers, a network, routers, and/or other devices. Alternatively, a data storage system need not be a distributed data-storage system and, consequently, may include one or more computer-accessible memories located within a single computer or device.

A collection of digital objects, print documents, and/or media assets can reside exclusively on the hard disk drive 20, compact disc 42, DVD 40, or on remote data storage devices, such as a networked hard drive accessible via the network 60, or on other local memory devices such as a memory stick. A collection of digital objects and documents can also be distributed across any or all of these storage locations. A collection of digital objects and documents may be represented by a database that uniquely identifies individual digital objects (e.g., such as a character file or print document) and their corresponding location(s). It will be understood that these digital objects can be media objects or non-media objects. Media objects can be digital images, such as those captured by scanner 6, audio data such as digital music or voice annotations, and digital video clips with or without sound. Media objects could also include files produced by graphic or animation software such as those produced by Adobe Photoshop™ or Adobe Flash™.

The invention claimed is:

1. A printing system comprising: an image capture device for capturing and storing an image of a user's handwritten alphanumeric characters, wherein each handwritten alphanumeric character is represented by a plurality of points, each point having x and y coordinates; memory for storing the handwritten alphanumeric characters in association with a standard alphanumeric character set, wherein the stored handwritten alphanumeric characters each comprise two mathematical functions defining a shape of the corresponding stored handwritten alphanumeric character, the first mathematical function corresponding to the x coordinates of the plurality of points and the second mathematical function corresponding to the y coordinates of the plurality of points, and wherein the mathematical function is a Taylor Series, a Maclaurin Series, a piecewise continuous Taylor Series, or a piecewise continuous Maclaurin Series; memory for storing a text document; and a processor for transcribing the text document into the stored handwritten alphanumeric characters.

2. The printing system of claim 1 further comprising a printer for printing the transcribed text document.

3. The printing system of claim 1 wherein the standard alphanumeric character set is a standard ASCII character set.

4. The printing system of claim 1 wherein the capture device is selected from the group consisting of a camera, a digitizing tablet, and a scanner.

5. The printing system of claim 3 wherein the standard ASCII character set is a standard English set of ASCII characters.

6. The printing system of claim 1 wherein the handwritten alphanumeric characters are stored in a format selected from the group consisting of JPEG, TIFF, and bitmap.

7. The printing system of claim 2 wherein the printer further comprises:
a plurality of media trays each containing a plurality of receiving sheets; and
memory for storing data designating a correct postage amount for each media sheet in the media trays for printing said correct postage amount on the media.

8. A system comprising: a computer; an electronic memory accessible by the computer for storing a digital image; a printer coupled to the computer, the printer including a plurality of receiver sheets for printing the digital image thereon; a printer interface for selecting an area of one of the receiver sheets for printing the selected digital image therein; a document editor for generating a document comprising text and the digital image, the text comprising known text characters, for printing on one of the receiver sheets; handwritten alphanumeric characters stored in the electronic memory, wherein each handwritten alphanumeric character is represented by a plurality of points, each point having x and y coordinates; wherein the stored handwritten alphanumeric characters each comprise two mathematical functions defining a shape of the corresponding stored handwritten alphanumeric character, the first mathematical function corresponding to the x coordinates of a plurality of points representing the stored handwritten alphanumeric character and the second mathematical function corresponding to the y coordinates of the plurality of points representing the stored handwritten alphanumeric character, and wherein the mathematical function is a Taylor Series, a Maclaurin Series, a piecewise continuous Taylor Series, or a piecewise continuous Maclaurin Series; and a processor for associating and transcribing the handwritten alphanumeric characters into corresponding ones of the known text characters.

9. The system according to claim 8 wherein the electronic memory includes correct postage information for each receiver type for marking the receiver with the correct postage during printing.

10. The system according to claim 8 wherein the printer prints the digital image on a first side of the receiver and the transcribed alphanumeric characters on a second side of the receiver.

11. The system according to claim 8 wherein the handwritten alphanumeric characters stored in the electronic memory are stored in a format selected from the group consisting of JPEG, TIFF, and a bitmap.

* * * * *